United States Patent [19]
Tanai

[11] Patent Number: 5,966,405
[45] Date of Patent: Oct. 12, 1999

[54] FREQUENCY DEVIATION MEASURING DEVICE

[75] Inventor: Masaharu Tanai, Tokyo, Japan

[73] Assignee: Ando Electric Co., Ltd., Tokyo, Japan

[21] Appl. No.: 08/820,341

[22] Filed: Mar. 12, 1997

[30] Foreign Application Priority Data

Mar. 15, 1996 [JP] Japan ................................. 8-087490

[51] Int. Cl.$^6$ ............................. H04B 3/46; H04B 17/00; H04L 27/22
[52] U.S. Cl. ............................................. 375/224; 375/332
[58] Field of Search ................................. 375/279, 281, 375/332, 329, 344, 326, 224; 329/304; 327/612, 620; 455/226.1

[56] References Cited

U.S. PATENT DOCUMENTS

| | | | |
|---|---|---|---|
| 5,561,665 | 10/1996 | Matsuoka et al. | 375/344 |
| 5,579,463 | 11/1996 | Takano et al. | 395/140 |
| 5,717,722 | 2/1998 | Mori | 375/326 |

*Primary Examiner*—Tesfaldet Bocure
*Attorney, Agent, or Firm*—Finnegan, Henderson, Farabow, Garrett & Dunner, L.L.P.

[57] ABSTRACT

A frequency deviation measuring device is used in fields of digital mobile communication systems to measure frequency deviations with respect to $\pi/4$ QPSK modulation signals in accordance with the phase locus method. A center frequency is detected on the basis of a spectrum distribution measured with respect to a testing signal which corresponds to a digital modulation signal. A non-modulation signal is generated based on the center frequency detected from the testing signal. Quasi-synchronization wave detection is performed on the testing signal and non-modulation signal to produce an IQ base band signal. A first frequency deviation is detected based on the IQ base band signal in accordance with the phase locus method. A second frequency deviation is detected based on a difference between the center frequency and a testing frequency set value. The first and second frequency deviations are added together to provide a measured value of a frequency deviation between the testing signal and testing frequency set value. Because the quasi-synchronization wave detection is performed using the non-modulation signal based on the center frequency which is detected based on the spectrum distribution of the testing signal, it is possible to increase a range of measurement for the frequency deviation up to $\frac{1}{5}$ or more of the symbol rate.

6 Claims, 5 Drawing Sheets

FREQUENCY DEVIATION MEASURING DEVICE

BACKGROUND OF THE INVENTION

1. Field of the Invention

The invention relates to frequency deviation measuring devices which measure frequency deviations with respect to carrier frequencies of digital modulation signals.

2. Prior Art

The frequency deviation measuring devices are used for frequency measuring devices to perform measurement on carrier frequencies of digital modulation signals. Specifically, the frequency deviation measuring devices use the phase locus method to measure frequency deviations of QPSK modulation signals of π/4 shift.

It is well known that the π/4 QPSK modulation method is employed in fields of digital mobile communication systems such as digital automobile phone systems, second-generation cordless phone systems. In those systems, great errors should occur if a frequency counter is used to measure a frequency. For this reason, the conventional systems employ the frequency deviation measuring method using the phase locus method.

FIG. 5 shows an example of a frequency deviation measuring device utilizing the conventional frequency deviation measuring method.

In FIG. 5, a signal generator 11 inputs a testing frequency set value ft to generate a reference signal S11. Herein, the reference signal S11 coherently corresponds to the set value ft. A quasi-synchronization wave detector 12 performs synchronous wave detection on a testing signal Sin to produce an IQ base band signal S12. Herein, the testing signal Sin is subjected to π/4 shift QPSK modulation based on the reference signal S11 generated by the signal generator 11. A frequency deviation detector 13 effects the phase locus method on the IQ base band signal S12, produced by the quasi-synchronization wave detector 12, to detect a frequency deviation S13 which is measured on the basis of the testing frequency set value ft.

Next, the content of the phase locus method will be described in detail with reference to FIGS. 6 and 7.

As shown in FIG. 6, the π/4 shift QPSK modulation method determines 4 series of values (or coordinates)(i.e., 00, 01, 11, 10) based on a phase variation regarding a certain start point '0' so as to contribute to data transmission.

FIG. 7 shows the content of the phase locus method on the basis of the assumption that a movement occurs from the start point 0 to a point of coordinates (00), for example. Herein, the movement brings an actual point 'A' other than an ideal point 'B'. So, a phase deviation Δθ is detected between the actual point A and the ideal point B. Thus, the phase locus method converts the phase deviation Δθ to a frequency deviation.

In the conventional frequency deviation measuring device described above, however, a range of measurement should be limited to frequencies approximately corresponding to 1/10 of a symbol rate. This is because if a frequency error is great, an error may occur in a decision of a symbol so that an accurate frequency deviation cannot be obtained.

For example, a transmission of a symbol of '01' requires an amount of phase shift of 135°. If a frequency error of '+4' kHz is added to the above amount of phase shift, in a system having a transmission speed of 21 kHz symbol/s, an amount of phase shift of 68° should be added, so that the measuring device will obtain a total amount of phase shift of 203°.

As described above, the transmission of the symbol of '01' has an ideal amount of phase shift of 135°, whilst a transmission of a symbol of '11' has an ideal amount of phase shift of 225°. So, the aforementioned total amount of phase shift is close to the ideal amount of phase shift provided for the transmission of the symbol of '11', rather than the ideal amount of phase shift provided for the transmission of the symbol of '01'. As a result, the measuring device mistakenly detects that the transmission of the symbol of '11' is made on the basis of the total amount of phase shift which should correspond to the transmission of the symbol of '01'.

When measuring a frequency error with respect to a symbol point '11' by using the phase locus method, the device performs a calculation to subtract an ideal amount of phase shift from an actual amount of phase shift for '11', as follows:

$$203° - 225° = -220°$$

That is, the device calculates a frequency error of −1.3 kHz. This causes a difference against the testing signal Sin which is actually shifted by '+4' kHz.

The basic standards (RCR STD-27) for the digital automobile phone systems allow frequency deviations of approximately '±3' kHz with respect to a symbol rate of 21 kHz symbol/s. So, the standards allow the measuring devices to have ranges of measurement of '±4' kHz or more, i.e., ranges of measurement corresponding to 1/5 or more of the symbol rate.

SUMMARY OF THE INVENTION

It is an object of the invention to provide a frequency deviation measuring device which is capable of realizing a sufficient range of measurement, for frequency deviations, which is increased up to 1/5 or more of a symbol rate.

A frequency deviation measuring device of the invention is used in fields of digital mobile communication systems to measure frequency deviations with respect to π/4 QPSK modulation signals in accordance with the phase locus method.

At first, a center frequency is detected on the basis of a spectrum distribution measured with respect to a testing signal which corresponds to a digital modulation signal. A non-modulation signal is generated based on the center frequency detected from the testing signal. The center frequency is located at a center of a range of measurement defined between a minimum frequency and a maximum frequency which are determined using sample points of the spectrum distribution regarding a sweep frequency band based on a testing frequency set value.

Next, quasi-synchronization wave detection is performed on the testing signal and non-modulation signal to produce an IQ base band signal. A first frequency deviation is detected based on the IQ base band signal in accordance with the phase locus method. A second frequency deviation is detected based on a difference between the center frequency and testing frequency set value. The first and second frequency deviations are added together to provide a measured value of a frequency deviation measured between the testing signal and testing frequency set value. Because the quasi-synchronization wave detection is performed using the non-modulation signal based on the center frequency which is detected based on the spectrum distribution of the testing signal, it is possible to increase a range of measurement for the frequency deviation up to 1/5 or more of the symbol rate.

BRIEF DESCRIPTION OF THE DRAWINGS

These and other objects of the subject invention will become more fully apparent as the following description is read in light of the attached drawings wherein.

DESCRIPTION OF THE PREFERRED EMBODIMENTS

Now, a detailed description will be given with respect to a frequency deviation measuring device in accordance with an embodiment of the invention.

Figure 1:
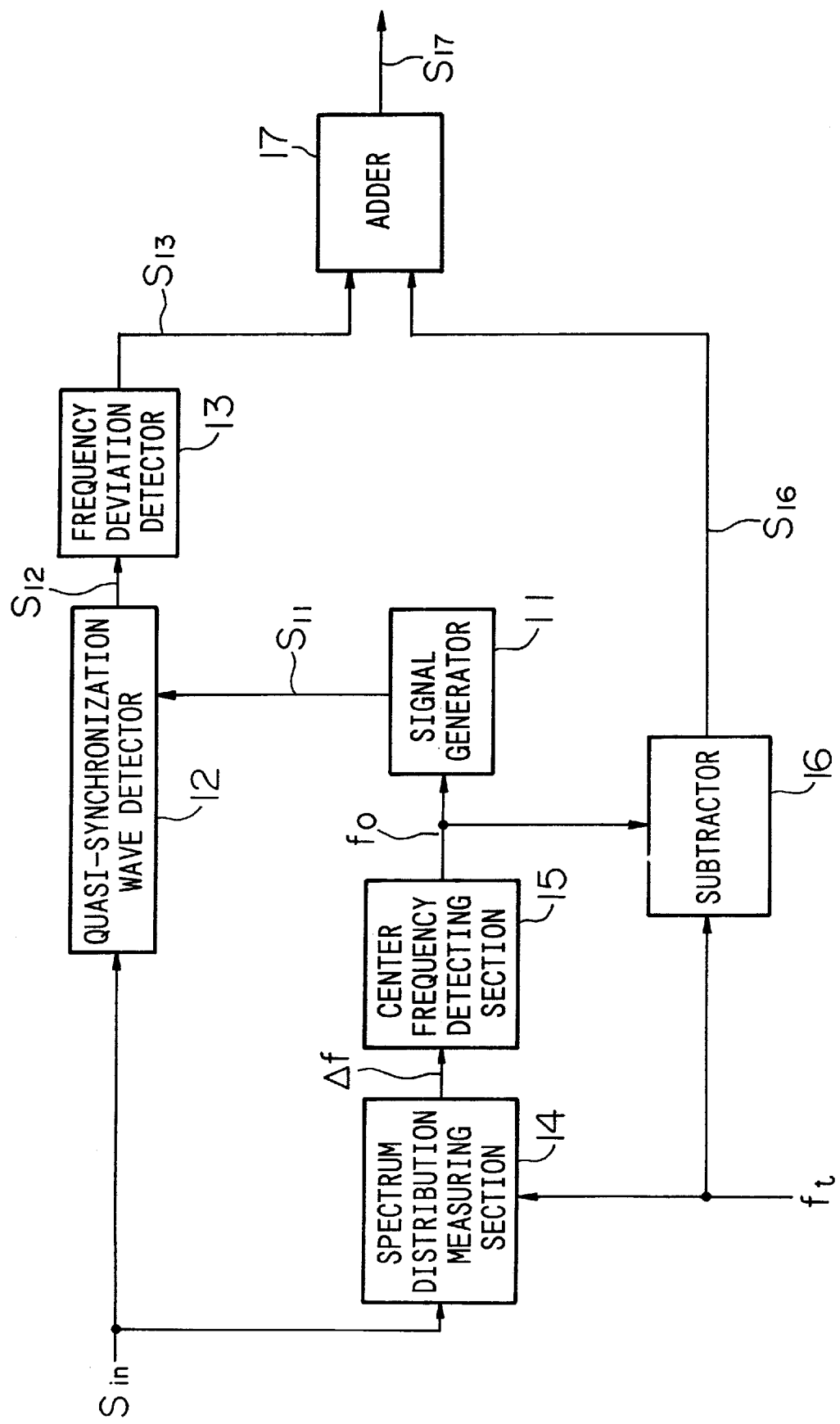
FIG. 1 is a block diagram showing a configuration of a frequency deviation measuring device which is designed in accordance with an embodiment of the invention.
Figure 5:
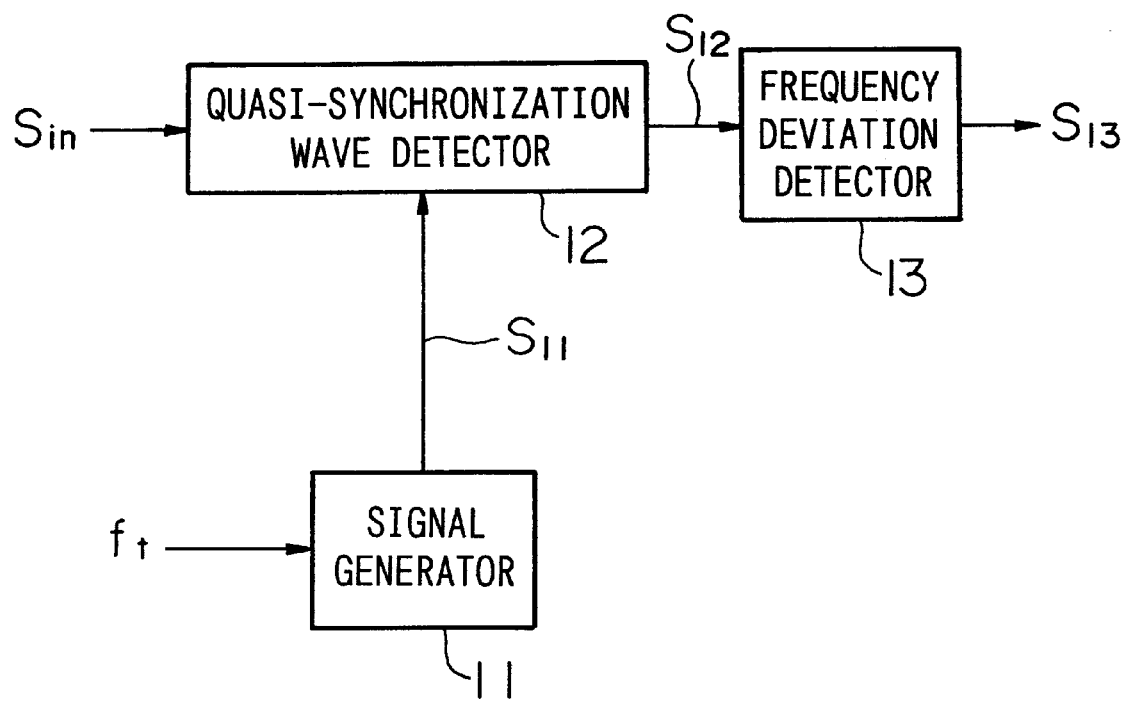
FIG. 5 is a block diagram showing a configuration of a conventional frequency deviation measuring device.
Figure 6:
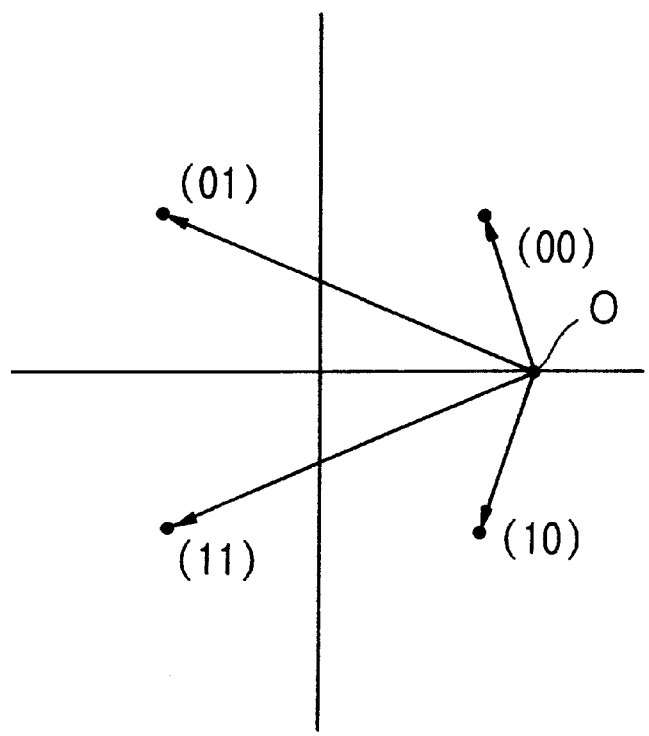
FIG. 6 is a diagram showing a signal space for the $\pi/4$ QPSK modulation method.
Figure 7:
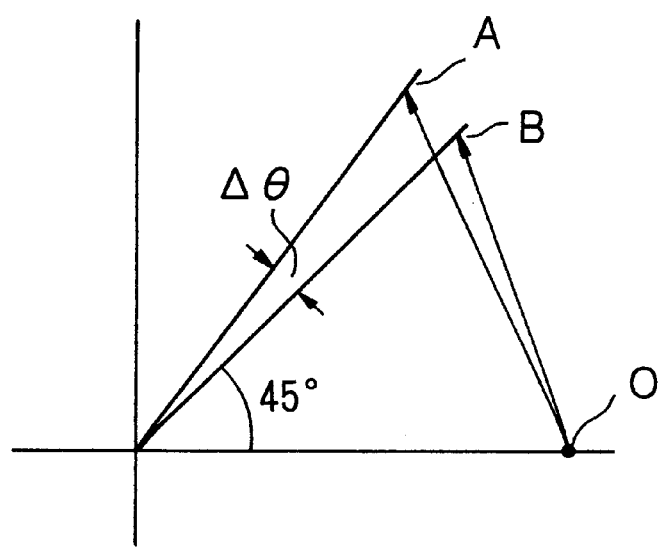
FIG. 7 is a diagram which is used to explain a method to measure a frequency deviation based on the phase locus method.

FIG. 1 is a block diagram showing an overall configuration of the frequency deviation measuring device of the present embodiment. For convenience' sake, parts of FIG. 1 which are equivalent to those of FIG. 5 will be designated by the same numerals; hence, a description thereof will be omitted.

In FIG. 1, a testing signal Sin (i.e., a $\pi/4$ QPSK modulation signal having a frequency deviation) is supplied to the quasi-synchronization wave detector 12 as well as a spectrum analysis measuring section 14. The spectrum distribution measuring section 14 measures an occupied frequency bandwidth $\Delta f$ of the modulation signal Sin on the basis of the testing frequency set value ft. A center frequency detecting section 15 detects a center frequency f0 of the occupied frequency bandwidth $\Delta f$. A value of the center frequency f0 is supplied to the signal generator 11 as well as a subtractor 15.

The subtractor 15 subtracts the value of the center frequency f0 from the testing frequency set value ft to produce a frequency deviation f16. The frequency deviation f16 is supplied to an adder 17 wherein it is added to a frequency deviation 13 which is detected by a frequency deviation detector 13. Thus, the adder 17 provides an output representing a result of measurement of the frequency deviation.

Next, a description will be given with respect to a method to measure the occupied frequency bandwidth in the spectrum distribution measuring section 14 as well as a method to detect its center frequency in the center frequency detecting section 15.

At first, a spectrum distribution is measured by performing a single sweep operation by using the testing frequency set value ft as the center frequency. Then, all sample points which exist within a sweep frequency band whose center is set at the testing frequency set value ft are inputted to the center frequency detecting section 15. Herein, the sweep frequency band of the spectrum distribution is increased approximately 3.5 times larger than the occupied frequency band.

Next, a minimum frequency f1 is calculated by a subtraction of "ft–fs/2", where ft denotes the testing frequency set value, and fs denotes the sweep frequency band. In addition, a maximum frequency f4 is caluculated by an addition of "ft+fs/2". Then, all sample points belonging to a frequency range between the minimum frequency f1 and the maximum frequency f4 are collected.

The center frequency detecting section 15 calculates a sum of the all sample points of the sweep frequency band to produce a full electric power. Next, additions of a certain electric power are sequentially performed in an upward direction from the minimum frequency f1, so that a limit sample point, corresponding to 0.5% of the full electric power, is searched and is then converted to a frequency which is used as a lower-limit frequency f2. Similarly, additions of the electric power are sequentially performed in a downward direction from the maximum frequency f4, so that a limit sample point, corresponding to 0.5% of the full electric power, is searched and is then converted to a frequency which is used as an upper-limit frequency f3.

So, the occupied frequency bandwidth $\Delta f$ corresponds to a result of a subtraction of "f3–f2". In addition, the center frequency f0 is obtained by a calculation of "(f2+f3)/2".

The subtractor 17 calculates the frequency deviation S16 between the center frequency f0 and the testing frequency set value ft. The signal generator 11 uses the center frequency f0 to generate a 'coherent' non-modulation signal S11. The quasi-synchronization wave detector 12 uses the non-modulation signal S11 as a reference signal thereof to perform quasi-wave detection on the testing signal Sin. Thus, the quasi-synchronization wave detector 12 produces an IQ base band signal S12.

The frequency deviation detector 13 uses the phase locus method to detect a frequency deviation S13 with respect to the center frequency f0 which is a frequency of the non-modulation signal S11. Thus, it is possible to obtain two frequency deviations S13 and S16. The adder 17 adds them together to produce a result (S17) of measurement of the frequency deviation measured between the testing signal Sin and the testing frequency set value ft.

According to the configuration and operations of the frequency deviation measuring device of FIG. 1, it is possible to measure a frequency deviation between the testing frequency set value ft and the testing signal Sin which is subjected to $\pi/4$ shift QPSK modulation. The present embodiment is effective even if the frequency deviation exceeds a range of measurement of the frequency deviation detector 13. That is, the signal generator 11 works to control the frequency f0 of the non-modulation signal S11 which is the reference signal for the quasi-synchronization wave detection, thus realizing matching state in which the frequency deviation belongs to the range of measurement. In other words, it is possible to enlarge the range of measurement for the frequency deviation.

Incidentally, the present embodiment is described with respect to the case where the testing signal Sin is the $\pi/4$ QPSK modulation signal. Of course, the present embodiment can cope with other digital modulation signals.

Next, a description will be given with respect to an embodiment regarding signals based on the specification (RCR STD-27) of the digital automobile phone systems.

The embodiment has a transmission speed of 42 kbps; and its testing frequency set value ft is set equal to the center frequency of 250 kHz. Herein, a range of measurement according to the phase locus method corresponds to 1/10 of the symbol rate. So, if the system of the embodiment has a symbol rate of 21 kHz-symbol/s, the range of measurement is expressed by ±2.1 kHz.

Next, a detailed description will be given with respect to an example of the embodiment for inputting a testing signal Sin corresponding to a signal, having frequency deviations of ±4 kHz, which is subjected to π/4 QPSK modulation.

Figure 2:
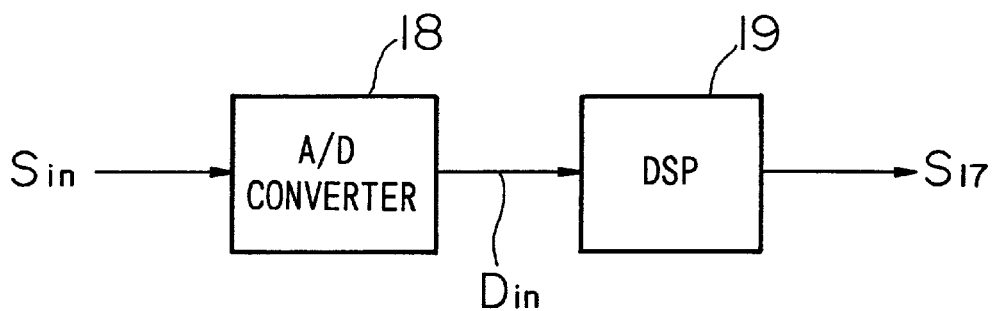
FIG. 2 is a block diagram showing a configuration of a frequency deviation measuring device in accordance with another embodiment of the invention.
Figure 3:
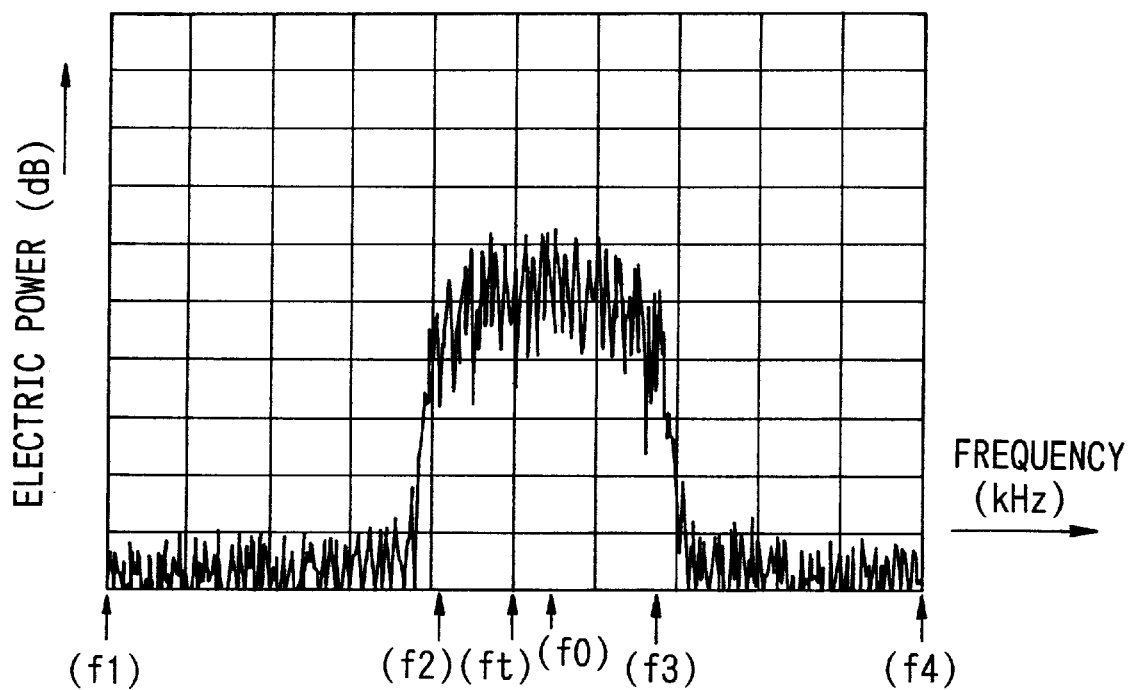
FIG. 3 is a graph showing a spectrum distribution.

FIG. 2 shows a configuration of the embodiment. Herein, a DSP (i.e., digital signal processor) 19 is designed to perform processes corresponding to all circuit elements of the device of FIG. 1. An analog-to-digital (A/D) converter 18 performs sampling operations of 1 MHz on the testing signal Sin to produce time-series data Din. The time-series data (i.e., a set of 4,096 data) are supplied to the DSP 19 which realizes processes of parts of the device of FIG. 1 in form of software. That is, the DSP 19 realizes processes of the spectrum distribution measuring section 14 by the software to perform fast Fourier transform on a number of data (i.e., 16,384 data), thus measuring a spectrum distribution. A graph of FIG. 3 shows the spectrum distribution after the fast Fourier transform.

As described above, the embodiment uses the time-series data, consisting of 16,384 data which are subjected to sampling operations of 1 MHz, to perform the fast Fourier transform. Thus, a resolution of the spectrum distribution may be approximately equivalent to 1/30 of the range of frequency measurement according to the phase locus method. That is, the resolution may be equivalent to 61 Hz. Such a resolution is high enough to obtain the center frequency f0.

The aforementioned standards of RCR STD-27 specify the occupied bandwidth at 28.8 kHz. So, the sweep frequency band is set approximately 3.5 times higher than this frequency. That is, the sweep frequency band is set at 100 kHz. An array of data are measured from the spectrum distribution in a range of measurement which is expressed by "ft±50 kHz" (where 'ft' denotes the testing frequency set value). The measured data are inputted to the center frequency detecting section 15 which is actually realized by the software in the DSP 19.

Because the testing frequency set value ft is 250 kHz, the minimum frequency f1 is 200 kHz whilst the maximum frequency f4 is 300 kHz. An array of spectra which are measured in a range of frequencies between 200 kHz and 300 kHz are added together to calculate the full electric power.

As for the lower-limit frequency f2, additions of the electric power are performed in an upward direction from the minimum frequency f1=200 kHz to search a point which corresponds to 0.5% of the full electric power. So, the lower-limit frequency is obtained by performing a frequency conversion on the above point. In case of FIG. 3, for example, the lower-limit frequency f2 is 241.27 kHz As for the upper-limit frequency f3, additions of the electric power are performed in a downward direction from the maximum frequency f4=300 kHz to search a point which corresponds to 0.5% of the full electric power. So, the upper-limit frequency is obtained by performing a frequency conversion on the above point. In case of FIG. 3, for example, the upper-limit frequency f3 is 267.88 kHz.

As described before, the center frequency f0 is obtained by a calculation expressed as follows:

{(lower-limit frequency)+(upper-limit frequency)}/2.

In case of FIG. 3, the center frequency is calculated as follows:

(241.27 kHz+267.88 kHz)/2=254.575 kHz

In addition, a frequency deviation S16 is obtained by a calculation expressed as follows:

(center frequency f0)−(testing frequency set value ft).

So, the embodiment measures the frequency deviation S16 of 4.575 kHz. Thus, the DSP 19 operates using the software as follows:

A signal generator 11 uses the center frequency f0 to generate a non-modulation signal S11. By using the non-modulation signal S11 as a reference signal, the quasi-synchronization wave detector 12 performs quasi-synchronization wave detection on the testing signal Sin to produce an IQ base band signal S12.

According to the phase locus method, the frequency deviation detector 13 uses the IQ base band signal S12 to detect a frequency deviation S13 with respect to the non-modulation signal S11. For example, the embodiment detects S13 at −0.570 kHz.

Figure 4A:
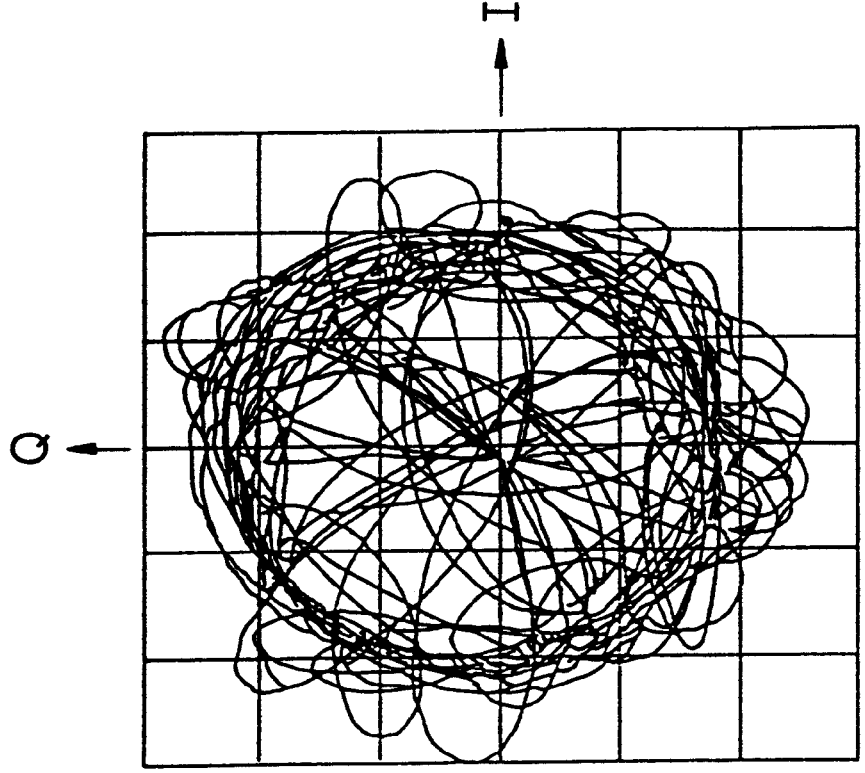
FIG. 4A is a graph showing curves, representing an IQ base band signal created by the invention, on the IQ coordinates plane.
Figure 4B:
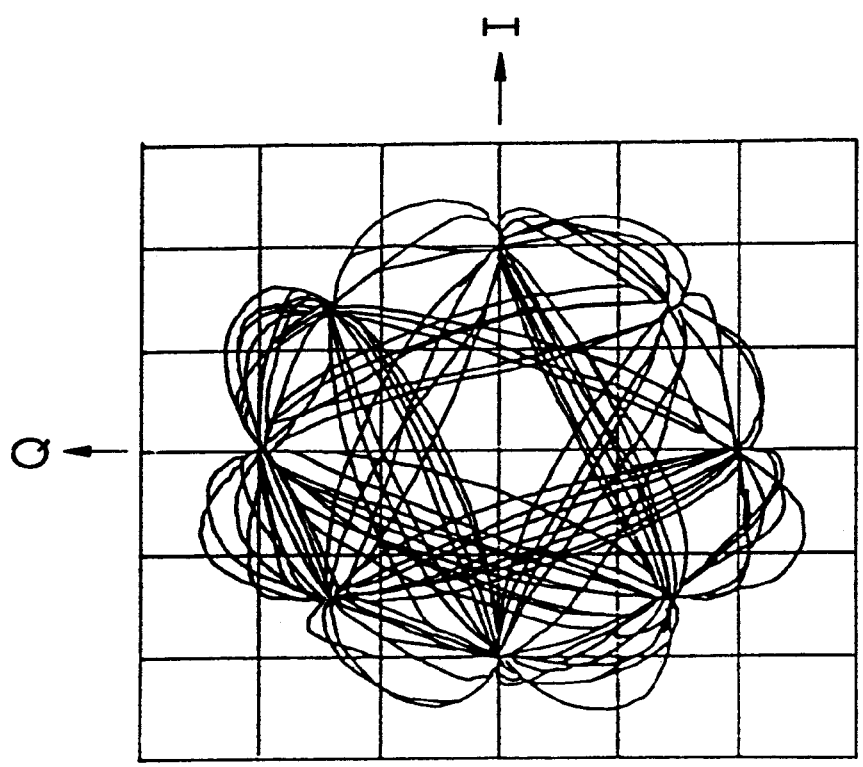
FIG. 4B is a graph showing curves, representing an IQ base band signal created by the conventional device, on the IQ coordinates plane.

FIG. 4A shows curves, representing the IQ base band signal S12 in the frequency deviation detector 13, on the IQ coordinates plane. For the comparison, FIG. 4B is provided to show curves, representing the IQ base band signal of the conventional device, on the IQ coordinates plane.

As described heretofore, it is possible to obtain a frequency deviation S17 between the testing signal Sin and the testing signal set value ft by adding the two frequency deviations S13 and S16 together. As a result, the embodiment of FIG. 2 provides the frequency deviation S17 of 4.005 kHz.

As this invention may be embodied in several forms without departing from the spirit of essential characteristics thereof, the present embodiments are therefore illustrative and not restrictive, since the scope of the invention is defined by the appended claims rather than by the description preceding them and all changes that fall within metes and bounds of the claims, or equivalence of such metes and bounds are therefore intended to be embraced by the claims.

What is claimed is:

1. A frequency deviation measuring device comprising:
   center frequency detecting means for detecting a center frequency of a testing signal inputted thereto;
   signal generating means for generating a non-modulation signal based on the center frequency;
   quasi-synchronization wave detection means for performing quasi-synchronization wave detection on the testing signal and the non-modulation signal so as to produce an IQ base band signal;
   first frequency deviation detecting means for detecting a first frequency deviation based on the IQ base band signal in accordance with a phase locus method;
   second frequency deviation detecting means for detecting a second frequency deviation representing a difference between the center frequency and a testing frequency set value which is set in advance; and
   addition means for performing an addition on the first frequency deviation and the second frequency deviation to provide a measured value of a frequency deviation measured between the testing signal and the testing frequency set value.

2. A frequency deviation measuring device as defined in claim 1 wherein the testing signal corresponds to a digital modulation signal.

3. A frequency deviation measuring device as defined in claim 1 wherein the center frequency detecting means comprises:

spectrum distribution measuring means for providing a sweep frequency band based on the testing frequency set value to perform sampling on the testing signal, thus measuring a spectrum distribution of the testing signal in a range of measurement defined between a minimum frequency and a maximum frequency; and full electric power measuring means for measuring a full electric power by calculating a sum of all sample points in the sweep frequency band;

lower-limit frequency detecting means for performing additions of an electric power in an upward direction from the minimum frequency to detect a limit sample point corresponding to a certain fraction of the full electric power, so that a lower-limit frequency is detected based on the limit sample point;

upper-limit frequency detecting means for performing additions of an electric power in a downward direction from the maximum frequency to detect a limit sample point corresponding to a certain fraction of the full electric power, so that an upper-limit frequency is detected based on the limit sample point; and center frequency calculating means for calculating the center frequency by dividing a sum of the lower-limit frequency and the upper-limit frequency by two.

4. A frequency deviation measuring device as defined in claim 1 further comprising analog-to-digital conversion means for converting the testing signal in a digital form, so that the testing signal in the digital form is supplied to the center frequency detecting means and the quasi-synchronization wave detection means.

5. A frequency deviation measuring device as defined in claim 1 wherein the testing signal corresponds to a $\pi/4$ QPSK modulation signal.

6. A frequency deviation measuring device as defined in claim 3 wherein the certain fraction of the full electric power corresponds to 0.5% of the full electric power.

* * * * *